Patented May 12, 1942

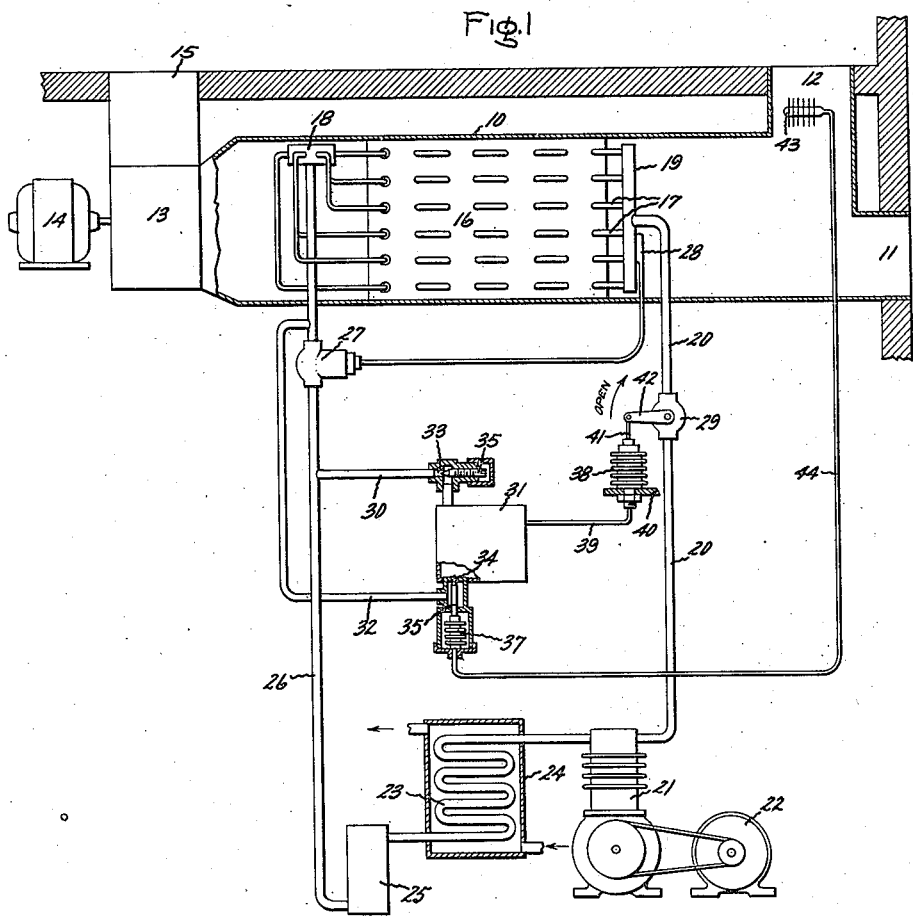

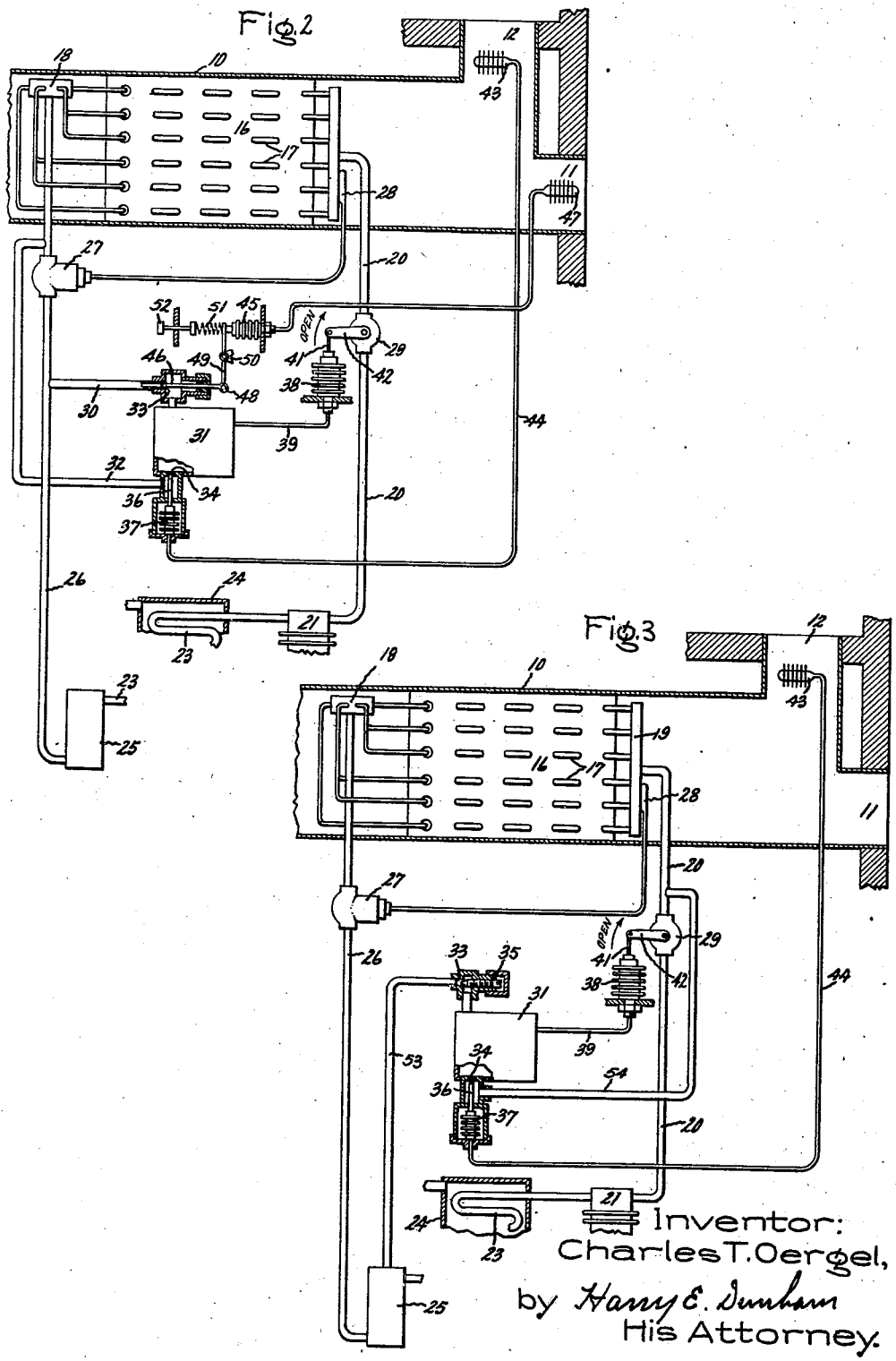

2,282,880

UNITED STATES PATENT OFFICE 2,282,880

REFRIGERATING SYSTEM

Charles T. Oergel, Erie, Pa., assignor to General Electric Company, a corporation of New York Application June 5, 1940, Serial No. 338,901

8 Claims. (Cl. 62—6)

My invention relates to refrigerating systems and particularly to refrigerant control arrangements for such systems.

Refrigerating systems may be required to function under widely varying load conditions and when the system includes a refrigerant compressor, it is desirable to provide some arrangement for changing the effective capacity of the compressor in accordance with changes of load. Such arrangements, for example, may change the effective capacity of the compressor by varying the speed of the driving motor or by returning a portion of the compressed refrigerant directly to the suction side of the compressor or by throttling the suction line of the compressor to vary the amount of refrigerant which it can withdraw from the evaporator. Some of these systems have not been entirely satisfactory because they are complicated and others because they cannot vary the capacity of the compressor in sufficiently small steps over a wide range of load. Furthermore, regardless of the particular arrangement employed for changing the effective capacity of the compressor, it is necessary to provide a control for the mechanism which is sufficiently sensitive to actuate it throughout the desired range. Accordingly it is an object of my invention to provide a refrigerating system including a compressor and a device for varying the effective capacity of the compressor and an improved arrangement for controlling the operation of the capacity varying device.

It is another object of my invention to provide a fluid cooling system including a refrigerating machine having a compressor and an evaporator and including an improved arrangement for controlling the effective capacity of the system in accordance with variations in a condition of the fluid to be cooled.

It is another object of my invention to provide an air conditioning system including a refrigerating machine having a compressor and an evaporator and an improved arrangement for varying the cooling capacity of the system in accordance with changes in one or more of the conditions of the air to be circulated over the evaporator for cooling.

Further objects and advantages of my invention will become apparent as the following description proceeds and the features of novelty which characterize my invention will be pointed out in the claims annexed to and forming a part of this specification.

For a better understanding of my invention, reference may be had to the accompanying drawings in which Fig. 1 illustrates diagrammatically an air conditioning system provided with a refrigerating system embodying my invention; Fig. 2 is a diagrammatic illustration similar to Fig. 1 illustrating another embodiment of my invention; Fig. 3 is a view similar to Figs. 1 and 2 illustrating a still further embodiment of my invention.

The refrigerating system illustrated on the drawings and described in detail herein in connection with an air conditioning system comprises essentially a closed refrigerant circuit including a compressor, a condenser and an evaporator. An expansion valve is provided for controlling the flow of refrigerant from the condenser to the evaporator, and in order to control the effective capacity of the compressor, a throttling valve is provided in the suction line between the evaporator and the compressor. The operation of the throttling valve is dependent upon the pressure drop across the expansion valve and in order to operate the throttling valve, a by-pass between the high and low sides of the refrigerating system is provided which includes a pressure chamber or passage and a device for actuating the valve in accordance with changes of pressure in the chamber. Restricted openings are provided in the inlet and outlet sides of the chamber and may be adjusted to vary the relative pressure effect in the chamber. This variation of pressure may be effected in accordance with a condition of the air or other fluid to be cooled and thermostatic elements have been illustrated to actuate the valve members in the inlet and outlet of the chamber in accordance with the temperature of the air or fluid to be circulated over the evaporator.

Referring now to the drawings, in Fig. 1 I have illustrated an air conditioning system including a conditioner housing or casing 10 having a fresh air inlet duct 11 and a return or recirculating air duct 12 communicating with the room to be conditioned. A mixture of fresh and recirculated air is circulated through the casing 10 by operation of a fan 13 driven by a motor 14 and the air is discharged into the room to be conditioned through an outlet duct 15. In order to cool the air circulating through the casing 10, I provide a refrigerating system including an evaporator or cooling coil 16 comprising a plurality of conduits 17 each connected at one end to an inlet header or manifold 18 and at its other end to an outlet or suction manifold 19. Liquid refrigerant vaporized in the evaporator 16 is withdrawn therefrom through a suction line 20 by operation of the compressor 21 driven by a motor 22. The gaseous refrigerant is compressed by the compressor and discharged into a condenser 23 where it is cooled by the circulation of water or other cooling fluid through a casing 24 surrounding the condenser coil. The liquefied refrigerant flows from the condenser to a liquid receiver 25 and from the receiver through a liquid line 26 to the evaporator 16 under the control of a thermostatic expansion valve 27. The valve 27 is of a type commonly employed in refrigerating systems and comprises an element which tends to close the valve upon a rise of pressure within the evaporator and a second element including a thermal bulb or feeler 28 for opening the valve upon a rise in temperature of the gaseous refrigerant withdrawn from the evaporator. A valve of this type is provided in order to control the superheat of the refrigerant vapor withdrawn from the evaporator. The compressor may be controlled in any desired manner, for example, the motor 22 may be started and stopped in accordance with the temperature of the air in the enclosure or in accordance with the pressure of the refrigerant on the suction side of the compressor. In order to control the effective capacity of the compressor, I provide a throttling valve 29 in the suction line 20. The position of this valve determines the rate at which the compressor can remove the vaporized refrigerant from the evaporator 16; and by controlling the valve in accordance with a condition of the fluid cooled by the system, the effective capacity of the compressor may be varied over a wide range of load.

Referring again to Fig. 1, I provide a by-pass around the expansion valve 27 comprising a connection 30 for conveying refrigerant from the liquid line 26 on the high pressure side of the valve 27 to a chamber 31 and thence through a connection 32 to the outlet side of the valve 27. The flow of refrigerant through this by-pass is controlled by an orifice 33 between the connection 30 and the chamber 31 and an orifice 34 between the chamber 31 and the connection 32. The effective size of the orifice 33 on the inlet side of the chamber 31 may be changed by operation of a manually adjustable screw 35 and the effective size of the orifice 34 on the outlet side of the chamber 31 may be varied by operation of a valve or plunger 36 connected to be actuated by a bellows or expansible diaphragm 37. By suitable selection of the size of the orifices 33 and 34, it is evident that the pressure in the chamber 31 may be maintained at any value between the pressure in the liquid line 26 and that in the evaporator 16. In order to actuate the throttling valve 29 I provide a bellows or expansible diaphragm 38 connected by a duct 39 to a chamber 31 and therefore dependent upon the pressure in the chamber 31. The bellows 38 is secured to a suitable fixed support 40 and is connected by a link 41 to an operating arm 42 of the valve 29. By suitable calibration of the apparatus and adjustment of the relative sizes of the orifices 33 and 34 as by movement of the screw 35, the arm 42 may be arranged to operate over its entire range in accordance with changes in the pressure of refrigerant in the chamber 31. In order to control the valve 29 in accordance with changes in the load requirements of the refrigerating system, I connect the bellows 37 so that it is actuated in accordance with the temperature of the air in the enclosure to be conditioned. This temperature may be measured by a suitable thermal element or feeler bulb 43 arranged in the return air duct 12. This bulb 43 is filled with a vaporizable liquid and the pressure generated thereby is transmitted through a tube or duct 44 to the bellows 37. The bellows 37 and 38 preferably are of the type commonly provided with springs (not shown) which may be adjusted for calibrating the control. With the thermal element connected as shown, an increase in the temperature of the air in the duct 12 will expand the bellows 37 and partially close the orifice 34. Since this orifice is on the outlet side of the chamber 31 there results an increase in the pressure of the chamber, and the bellows 38 expands in accordance therewith and moves the arm 42 in a clockwise direction to increase the opening of the throttling valve 29 and thereby increase the effective capacity of the compressor. This increase in the effective capacity of the compressor will enable the evaporator 16 to increase its cooling effect on the air circulated thereover and the temperature in the enclosure to be conditioned will, therefore, be lowered. The temperature of the bulb 43 will then detect the decrease in the temperature of the air and the bellows 37 will then be contracted to lower the pressure in the chamber 31 and decrease the opening in the throttling valve 29. It will be evident that the changes in pressure of the refrigerant in the chamber 31 will follow the changes in temperature of the air passing through the duct 12 and the effective capacity of the compressor 21 will be varied continuously in accordance with variations of the temperature of the return air. The feeler bulb 43 and bellows 37 are sufficiently sensitive over the range of temperatures to be encountered in the operation of an air conditioning system to vary the size of the orifice 34 effectively over a wide range of load. By applying the motive power of the thermal system for varying the size of the orifice 34 to change the pressure in the chamber 31, sufficient power is made available to actuate the throttling valve bellows 38 and control the effective capacity of the compressor over a wide range of load and with the required sensitivity of the control. Obviously the size of the orifice 34 may be varied in accordance with any condition of the air in the enclosure to be conditioned or in the duct 10.

In Fig. 2 I have illustrated an air conditioning system similar to that shown in Fig. 1 and corresponding parts have been designated by the same numerals. The arrangement of Fig. 2 provides a control of the throttling valve 29 in accordance with the temperatures of both the room and outdoor air and, in effect, provides a temperature differential control. In order to provide the additional control element, I provide a bellows 45 and a valve plunger 46 for varying the effective size of the orifice 33 on the inlet side of the chamber 31, this control taking the place of the manually adjustable screw 35. The bellows 45 is connected to be actuated by a thermal element or feeler bulb 47 arranged in the path of the fresh air admitted to the casing 10 through the duct 11. The bulb 47 is similar to the bulb 43 and operates to vary the volume of the bellows 45 in accordance with changes in the temperature of the incoming air. Since it is desired to increase the effective capacity of the compressor upon an increase in outdoor temperature, the bellows 45 is arranged to open or increase the effective size of the orifice 43 upon a rise of temperature of incoming air thereby increasing the effective pressure in the chamber 31 and tending to open the valve 29.

In order to actuate the plunger 46 to vary the effective size of the orifice 33 inversely in accordance with changes in temperature of the air in the duct 11, the plunger is connected at 48 to a link 49 having a stationary pivot at 50. The link 49 is actuated by the bellows 45 in opposition to a spring 51. The tension of the spring may be adjusted by turning a screw 52 to calibrate the control. It will readily be apparent that bulbs 43 and 47 are both arranged to call for an increase of the pressure in the chamber 31 upon an increase of temperature. Since both thermal controls affect the pressure in the chamber 31, this pressure will be maintained at some value which is a resultant of the pressures which the separate controls attempt to maintain and the resulting effective capacity of the compressor will provide the required degree of cooling of the mixture of air coming from the two ducts 11 and 12. This control arrangement therefore operates in a similar manner to an indoor-outdoor differential thermostat.

In Fig. 3 I have illustrated a further embodiment of my invention similar to Fig. 1, and again corresponding parts have been designated by the same numerals. In this arrangement the by-pass around the thermostatic expansion valve is arranged so that little, if any, liquid refrigerant will pass therethrough. A connection 53 is employed instead of the connection 30 of Figs. 1, and 2, and the connection 53 communicates with the liquid receiver 25 above the normal level of liquid refrigerant so that only gaseous refrigerant is conveyed to the orifice 33. In order to return the gaseous refrigerant to the compressor without passing it through the evaporator, I provide a connection 54 leading from the orifice 34 to the suction line 20 on the inlet side of the valve 29, this connection being employed instead of the connection 32 of Figs. 1 and 2. The operation of the system shown in Fig. 3 is substantially the same as that shown in Fig. 1 and the effective capacity of the compressor 21 is varied in accordance with return air temperature in the same manner as described in connection with Fig. 1.

It will readily be apparent from the foregoing that I have provided a simple and rugged control arrangement of high sensitivity for varying the effective capacity of the compressor of a refrigerating system over a wide range of load in accordance with the temperature or other condition of the fluid to be cooled.

While I have described my invention in connection with an air conditioning system arranged to be actuated in accordance with changes in temperature of the incoming air, other applications will readily be apparent to those skilled in the art. I do not, therefore, desire my invention to be limited to the construction shown and described and I intend in the appended claims to cover all modifications within the spirit and scope of my invention.

What I claim as new and desire to secure by Letters Patent of the United States is:

1. An air conditioning system including a refrigerating machine comprising a compressor and a condenser and an evaporator, means for circulating air to be cooled over said evaporator and for discharging said air into an enclosure to be conditioned, an expansion valve for controlling the flow of refrigerant from said condenser to said evaporator, means providing a by-pass for the flow of refrigerant around said expansion valve from the high side of said machine to the low side thereof whereby the flow of refrigerant through said by-pass varies in accordance with variations in the pressure drop across said expansion valve, said means having a chamber therein and restricted orifices on the inlet and outlet sides of said chamber for limiting the flow of refrigerant to and from said chamber, means for varying the effective size of the one of said orifices on the outlet side of said chamber, means dependent upon the pressure of the refrigerant in said chamber for controlling the flow of gaseous refrigerant from said evaporator to said compressor, and means dependent upon the temperature of the air in the enclosure to be conditioned for controlling said means for varying the effective size of said outlet orifice to change the effective size of said outlet orifice directly in accordance with changes in the temperature of the air in the enclosure.

2. A fluid cooling system including a refrigerating machine comprising a compressor and a condenser and an evaporator, means for circulating a fluid to be cooled over said evaporator, an expansion valve for controlling the flow of refrigerant from said condenser to said evaporator, means providing a by-pass for the flow of refrigerant around said expansion valve from the high side of said machine to the low side thereof, said means having a chamber therein and restricted orifices on the inlet and outlet sides of said chamber for limiting the flow of refrigerant to and from said chamber, manually operable means for varying the effective size of the one of said orifices on the inlet side of said chamber, means dependent upon a condition of the fluid to be cooled for varying the effective size of the one of said orifices on the outlet side of said chamber, and means dependent upon the pressure of the refrigerant in said chamber for controlling the flow of gaseous refrigerant from said evaporator.

3. A refrigerating system including a compressor and a condenser and an evaporator connected to provide a closed refrigerant circuit, a liquid receiver in said circuit between said condenser and said evaporator, an expansion valve for controlling the flow of liquid refrigerant from said receiver to said evaporator, means providing a by-pass for the flow of refrigerant from said receiver around said expansion valve to the inlet of said evaporator whereby the flow of refrigerant through said by-pass varies in accordance with variations in the pressure drop across said expansion valve, said means having a chamber therein and restricted orifices on the inlet and outlet sides of said chamber for limiting the flow of refrigerant to and from said chamber, and means dependent upon the pressure of the refrigerant in said chamber for controlling the flow of gaseous refrigerant from said evaporator to said compressor.

4. A refrigerating system including a compressor and a condenser and an evaporator connected to provide a closed refrigerant circuit, a liquid receiver in said circuit between said condenser and said evaporator, said receiver having a portion arranged normally to contain gaseous refrigerant, an expansion valve for controlling the flow of liquid refrigerant from said receiver to said evaporator, means providing a by-pass for gaseous refrigerant from said portion of said receiver around said valve and to the outlet side of said evaporator whereby the flow of refrigerant through said by-pass varies in accordance with variations in the pressure drop across said expansion valve, said means having a chamber therein and restricted orifices on the inlet and outlet sides of said chamber for limiting the flow of refrigerant to and from said chamber, and means arranged between the outlet of said evaporator and the inlet of said compressor and dependent upon the pressure of the refrigerant in said chamber for controlling the flow of gaseous refrigerant from said evaporator to said compressor.

5. A fluid cooling system including a refrigerating machine comprising a compressor and a condenser and an evaporator, means for circulating a fluid to be cooled over said evaporator, an expansion valve for controlling the flow of refrigerant from said condenser to said evaporator, means providing a by-pass for the flow of refrigerant around said expansion valve from the high side of said machine to the low side thereof, said means having a chamber therein and restricted orifices on the inlet and outlet sides of said chamber for limiting the flow of refrigerant to and from said chamber, separate means for varying the effective size of each of said orifices, means dependent upon the pressure of the refrigerant in said chamber for controlling the flow of gaseous refrigerant from said evaporator to said compressor, means responsive to a condition of fluid to be cooled for actuating the means for varying the one of said orifices at the inlet side of said chamber, and means responsive to a condition of fluid to be cooled for actuating the means for varying the effective size of the one of said orifices at the outlet of said chamber whereby the operation of said evaporator is dependent upon the condition of fluid to be cooled.

6. An air conditioning system including a refrigerating machine comprising a compressor and a condenser and an evaporator, means for circulating air to be cooled over said evaporator and for discharging said air into an enclosure to be conditioned, an expansion valve for controlling the flow of refrigerant from said condenser to said evaporator, means providing a by-pass for the flow of refrigerant around said expansion valve from the high side of said machine to the low side thereof, said means having a chamber therein and restricted orifices on the inlet and outlet sides of said chamber for limiting the flow of refrigerant to and from said chamber, means responsive to a condition of the air in the enclosure to be conditioned for varying the effective size of one of said orifices, means responsive to a condition of fresh air outside said enclosure for varying the effective size of the other of said orifices, and means dependent upon the pressure of the refrigerant in said chamber for controlling the flow of gaseous refrigerant from said evaporator to said compressor.

7. An air conditioning system including a refrigerating machine comprising a compressor and a condenser and an evaporator, means including a recirculated air duct and a fresh air duct for circulating air to be cooled over said evaporator and for discharging air into an enclosure to be conditioned, an expansion valve for controlling the flow of refrigerant from said condenser to said evaporator, means providing a by-pass for the flow of refrigerant around said expansion valve from the high side of said machine to the low side thereof, said means having a chamber therein and restricted orifices on the inlet and outlet sides of said chamber for limiting the flow of refrigerant to and from said chamber, means including a thermostat in said recirculated air duct for varying the effective size of one of said orifices in accordance with the temperature of the air in said enclosure, means including a thermostat in said fresh air duct for varying the effective size of the other of said orifices in accordance with the temperature of the fresh air, and means dependent upon the pressure of the refrigerant in said chamber for controlling the flow of gaseous refrigerant from said evaporator to said compressor.

8. An air conditioning system including a refrigerating machine comprising a compressor and a condenser and an evaporator, means including a recirculated air duct and a fresh air duct for circulating air to be cooled over said evaporator and for discharging air into an enclosure to be conditioned, an expansion valve for controlling the flow of refrigerant from said condenser to said evaporator, means providing a by-pass for the flow of refrigerant around said expansion valve from the high side of said machine to the low side thereof, said means having a chamber therein and restricted orifices on the inlet and outlet sides of said chamber for limiting the flow of refrigerant to and from said chamber, means for varying the effective size of the one of said orifices on the inlet side of said chamber directly in accordance with the temperature of the air passing through one of said ducts, means for varying the effective size of the one of said orifices on the outlet side of said chamber inversely in accordance with the temperature of the air in the other one of said ducts, and means dependent upon the pressure of the refrigerant in said chamber for controlling the flow of gaseous refrigerant from said evaporator to said compressor.

CHARLES T. OERGEL.